United States Patent

Kimura

[11] Patent Number: 5,986,741
[45] Date of Patent: Nov. 16, 1999

[54] IMAGING APPARATUS

[75] Inventor: Tsutomu Kimura, Kanagawa, Japan

[73] Assignee: Fuji Photo Film Co., Ltd., Kanagawa, Japan

[21] Appl. No.: 08/856,977

[22] Filed: May 15, 1997

[30] Foreign Application Priority Data

May 15, 1996 [JP] Japan .................................... 8-120529

[51] Int. Cl.$^6$ ................................................. G03B 27/80
[52] U.S. Cl. ................................ 355/38; 355/68; 355/71; 358/527; 358/302
[58] Field of Search ................................ 355/32, 35, 38, 355/68, 71; 358/302, 487, 527, 506; 348/280

[56] References Cited

U.S. PATENT DOCUMENTS

| 4,692,794 | 9/1987 | Suzuki | 355/38 |
| 4,821,073 | 4/1989 | Backus et al. | 355/68 |
| 5,006,886 | 4/1991 | Suzuki | 355/38 |

Primary Examiner—Alan A. Mathews
Attorney, Agent, or Firm—Sughrue, Mion, Zinn, Macpeak & Seas, PLLC

[57] ABSTRACT

An imaging apparatus for reading an image recorded on a photographic film includes: a solid-state imaging device on which an image derived from light transmitted through the photographic film is formed; a density-measuring device for receiving the light transmitted through the photographic film and for measuring a large area transmittance density of the image for each color of R, G, and B; and a correcting device for correcting image color signals on the respective colors of R, G, and B outputted from the solid-state imaging device, on the basis of a ratio of large area transmittance densities of the image for the respective colors of R, G, and B determined from an RGB output of the density-measuring device. Accordingly, since the image color signals on R, G, and B outputted from the solid-state imaging device are corrected in correspondence with the large area transmittance densities of the image for the respective colors of R, G, and B determined from the RGB output of the density-measuring device, it is possible to obtain image color signals having accurate color information irrespective of the spectral sensitivity characteristics of the solid-state imaging device.

26 Claims, 5 Drawing Sheets

IMAGING APPARATUS

BACKGROUND OF THE INVENTION

1. Field of the Invention

The present invention relates to an imaging apparatus, and more particularly to an imaging apparatus for reading an image recorded on a photographic film.

2. Description of the Related Art

Hitherto, techniques have been proposed concerning so-called digital printing in which light is used to illuminate an image recorded on a photographic film, the light transmitted through the image is read and converted into image color signals representing the respective colors, red (R), green (G), and blue (B), and printing is effected on the basis of the converted image color signals. In addition to the just-described digital printing, image display apparatuses have been used in which an image recorded on a photographic film is read and image color signals are obtained, and the image is displayed on a monitor such as a CRT on the basis of the image color signals obtained.

When the image recorded on the photographic film is displayed on a monitor such as a CRT or printed onto a predetermined recording material, it is necessary to set exposure conditions and the like which make it possible to effect the display or printing properly. Conventionally, a MOS-type imaging imaging device (MOS sensor) is used as a sensor for setting the exposure conditions, while a solid-state imaging device (CCD sensor) is used as an image-reading sensor. Although the MOS sensor has a low spatial resolution, the MOS sensor is capable of providing conditions concerning color, while the CCD sensor is capable of obtaining image information with a high spatial resolution.

However, there has been a problem in that despite the fact that the MOS sensor is relatively expensive and leads to the high cost of the apparatus as a whole, since the CCD sensor does not have sufficiently satisfactory performance concerning color, the MOS sensor is inevitably used.

SUMMARY OF THE INVENTION

The present invention has been devised in view of the above-described circumstances, and it is an object of the present invention to provide an imaging apparatus which is capable of obtaining image color signals with accurate color information and a high spatial resolution without using the MOS sensor.

To attain the above object, in accordance with a first aspect of the present invention, there is provided an imaging apparatus for reading an image recorded on a photographic film, comprising: a solid-state imaging device on which an image derived from light transmitted through the photographic film is formed; a density-measuring device for receiving the light transmitted through the photographic film and for measuring a large area transmittance density of the image for each color of R, G, and B; and correcting means for correcting image color signals for the respective colors of R, G, and B outputted from the solid-state imaging device, on the basis of a ratio of large area transmittance densities of the image for the respective colors of R, G, and B determined from an RGB output of the density-measuring device.

In the above-described first aspect of the invention, an image derived from the light transmitted through the photographic film is formed on the solid-state imaging device and is read, and the light transmitted through the photographic film is received by the density-measuring device, and large area transmittance densities of the image are measured for the respective colors of R, G, and B. Here, as the density-measuring device, it is preferable to use a sensor whose dynamic range and sensitivity are high, such as a photodiode, a phototransistor, or a photomultiplier tube. In the correcting means, the image color signals for the respective colors of R, G, and B outputted from the solid-state imaging device are corrected on the basis of the ratio of large area transmittance densities of the image for the respective colors of R, G, and B determined from the RGB output of the density-measuring device.

In the above, since the image color signals for the respective colors of R, G, and B outputted from the solid-state imaging device are corrected in correspondence with the ratio of large area transmittance densities of the image for the respective colors of R, G, and B determined from the RGB output of the density-measuring sensor, i.e., color information of the measured image, it is possible to obtain image color signals having accurate color information irrespective of the spectral sensitivity characteristics of the solid-state imaging device. Moreover, since the image color signals from the solid-state imaging device are corrected in correspondence with the color information on the image measured by the density-measuring sensor, it is possible to determine the exposure conditions at the time of printing or the like by using the corrected image color signals. Hence, it becomes unnecessary to use the MOS sensor in the conventional manner, thereby making it possible to lower the cost of the apparatus. Namely, since the exposure conditions and the like are determined by using the image color signals from the solid-state imaging device, it becomes unnecessary to obtain image information by an exposure-condition setting device (exposure-condition setting sensor) in the conventional manner, so that a sensor such as an inexpensive photodiode or the like can be used instead of the expensive MOS sensor.

It should be noted that since the aforementioned ratio of large area transmission densities corresponds to the output ratio of the density-measuring sensor, processing can be effected most speedily by making corrections on the basis of the output ratio of this density-measuring device.

In accordance with a second aspect of the present invention, the imaging apparatus according to the first aspect of the invention further comprises: dynamic-range changing means for changing a dynamic range when the image is imaged by the solid-state imaging device on the basis of the output of the density-measuring device.

In accordance with this aspect, since the dynamic range at the time of imaging is changed on the basis of the output of the density-measuring device, the image color signals outputted from the solid-state imaging device can be adjusted to optimal levels irrespective of the density of the image recorded on the photographic film. That is, the above-described density-measuring device has a high dynamic range and a high sensitivity, and is therefore capable of receiving the light transmitted through the image irrespective of the density of the image, whereas the solid-state imaging device has a narrow dynamic range, so that there are cases where each image at the solid-state imaging device is saturated or becomes too small depending on the density of the image. In the present invention, since the dynamic range at the time of printing is changed on the basis of the density of the image, it is possible to allow the solid-state imaging device to output image color signals of optimal levels. This method of changing the dynamic range, may include a method in which the signal storage time (sensitivity) of the solid-state imaging device is changed, a method in which the quantity of light incident upon the solid-state imaging device is changed.

In accordance with a third aspect of the present invention, in an apparatus according to the first or second aspect of the invention, a spectral sensitivity of the density-measuring device is made to conform to a spectral sensitivity of a recording material for printing.

In the above-described third aspect of the invention, since the image color signals on R, G, and B obtained from the solid-state imaging device can be further corrected in such a manner as to conform to the spectral sensitivity characteristics of the recording material for printing, it is possible to reproduce correct color when an image is printed on the recording material.

In accordance with a fourth aspect of the present invention, in an apparatus according to one of the first to third aspects of the invention, the density-measuring device is disposed in a direction of light branching by light branching means which is disposed on an optical path of the transmitted light and is adapted to branch off part of the light leading to the solid-state imaging device.

In this fourth aspect of the invention, part of the light transmitted through the image and leading to the solid-state imaging device is made to branch off, and is received by a front surface of the density-measuring device, in order to accurately measure the large area transmittance densities of the image.

In accordance with a fifth aspect of the present invention, in an apparatus according to one of the first to fourth aspects of the invention, correction values of color failure are calculated on the basis of the image color signals corrected by the correcting means, and exposure data is calculated on the basis of the correction values.

In the fifth aspect of the invention, since the correction values of color failure are calculated on the basis of the corrected image color signals, and exposure data (e.g., exposure amount) is obtained on the basis of the calculated results, the dynamic range of the solid-state imaging device can be effectively used, thereby making it possible to obtain highly accurate exposure data.

The above and other objects, features and advantages of the present invention will become more apparent from the following detailed description of the invention when read in conjunction with the accompanying drawings.

DESCRIPTION OF THE PREFERRED EMBODIMENT

Referring now to the accompanying drawings, a detailed description will be given of the preferred embodiment of the present invention.

Figure 1:
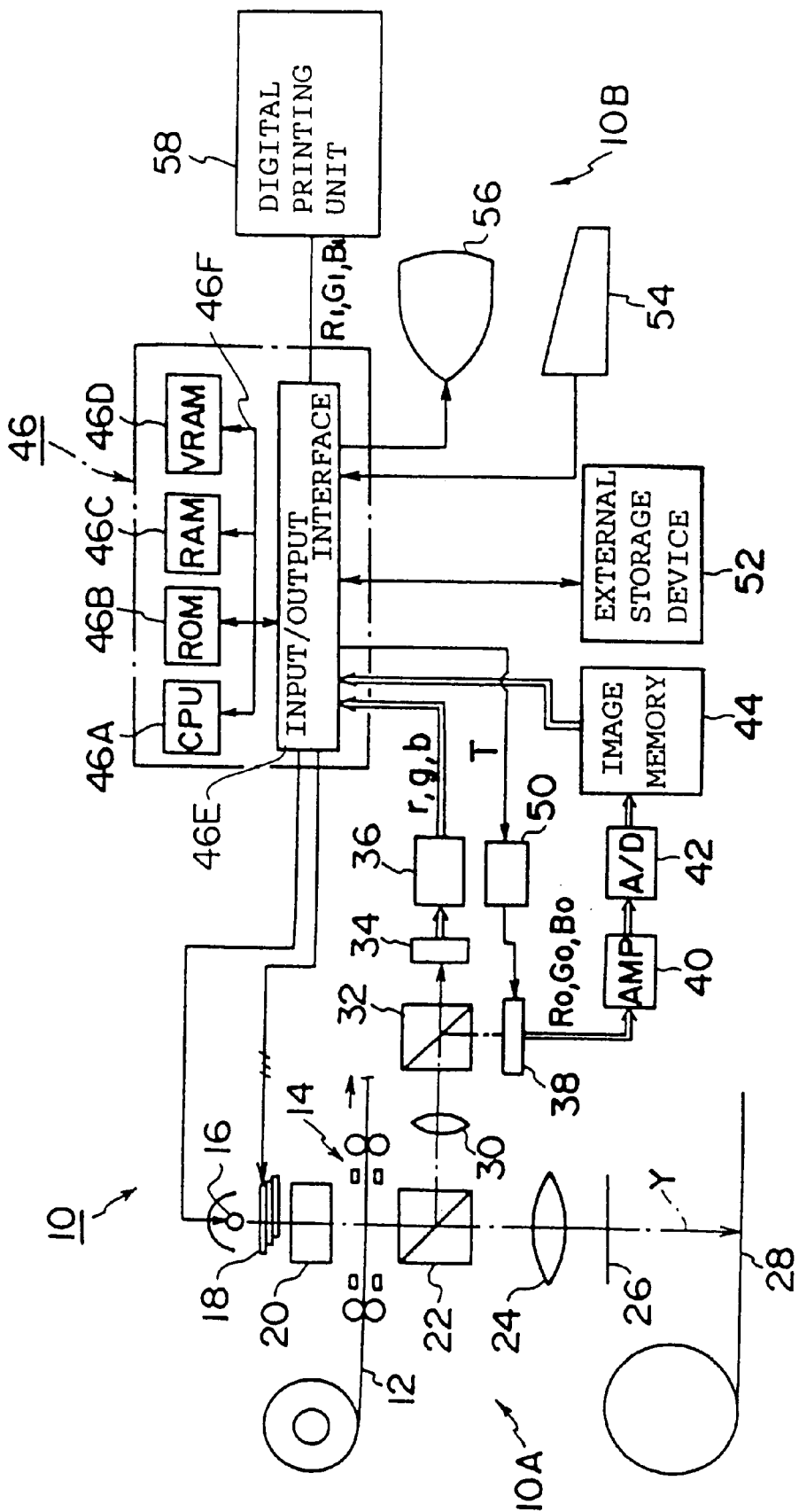
FIG. 1 is a schematic diagram illustrating a photographic printer to which the present invention is applied.

FIG. 1 shows a photographic printer 10 to which an imaging apparatus in accordance with the present invention is applied. The photographic printer 10 is comprised of an image printing section 10A for printing in units of frames a plurality of images recorded on a negative film onto a recording material such as a photographic printing paper or the like, as well as an image processing section 10B for reading the plurality of images and converting the same into image data and for displaying the images on the CRT, or the like, on the basis of the converted image data, or for printing so-called index images and the like. The image printing section 10A is provided with a negative carrier 14 for transporting a negative film 12 and positioning a predetermined image frame at a printing position. A white light source 16 constituted by a halogen lamp or the like, a light-adjusting filter 18, and a diffusion box 20 are arranged in that order above the negative carrier 14. As for the light emitted from the white light source 16, after the quantities of light of the respective colors of R, G, and B are adjusted (color-corrected) by the color-adjusting filter 18, the light uniformly illuminates the negative film 12 through the diffusion box 20. An image-forming lens system 24, a black shutter 26, and a photographic printing paper 28 are arranged in that order below the negative carrier 14, and an image derived from the light transmitted through the negative film 12 is formed on the photographic printing paper 28 by the image-forming lens system 24 so as to be printed.

A first light-branching member 22 constituted by a half prism or the like is disposed in a printing optical path Y between the negative film 12 and the image-forming lens system 24 so as to branch part of the light, which has been transmitted through the negative film 12, from the printing optical path Y. A lens 30 and a second light-branching member 32 are arranged in that order on an optical path of the light branched off (reflected) by the first light-branching member 22, so as to further branch the light, which has been branched off by the first light-branching member 22, into two directions.

A two-dimensional solid-state imaging device 38 is disposed on one of the optical paths of the light which is branched off (reflected) by the second light-branching member 32, so as to allow an image derived from the light branched off from the printing optical path Y by the first light-branching member 22 to be formed on the solid-state imaging device 38 through the lens 30 and the second light-branching member 32. The solid-state imaging device 38 divides the image, derived from the light transmitted through the negative film 12, into a plurality of regions (pixels), and reads the same. At the same time, the solid-state imaging device 38 spectrally separates each divided region into the three colors, R, G, and B, measures the densities of the regions, and outputs information on the measured densities of R, G, and B as an image color signal from its output terminal. An image memory 44 is connected to the signal output terminal of the solid-state imaging device 38 via an amplifier 40 and an A/D converter 42.

An LATD sensor (corresponding to a density-detecting photosensor in the present invention) 34 for measuring the large area transmittance density (LATD) of the image is disposed on the other optical path of the light branched (transmitted) by the second light-branching member 32. The LATD sensor 34 has three photodiodes (not shown) corresponding to the three colors, R, G, and B, separates the reflected light fetched from the printing optical path Y by the first light-branching member 22 into the color components of R, G, and B, and receives the same. Incidentally, the sensitivities of the three photodiodes are set in advance in such a manner as to match the spectral sensitivity of the printing paper 28, and an RGB output signal ratio of the LATD sensor 34 is adjusted in such a manner as to match the spectral sensitivity of the printing paper 28. Further, the LATD sensor 34 is disposed at a position offset from the focal plane so as to output average information on the negative plane, and is thus positioned so as not to obtain information restricted to a specific position in the negative.

An arithmetic and control unit 46 is connected to the LATD sensor 34 via a log converter 36. Signals corresponding to the quantities of light of the respective colors of R, G, and B detected by the LATD sensor 34 are converted into information representing LATDs (hereafter referred to as LATD information) r, g, and b by the log converter 36, and the LATD information r, g, and b is fetched by the arithmetic and control unit 46. The arithmetic and control unit 46 is comprised of a CPU 46A, a ROM 46B, a RAM 46C, a VRAM 46D, and an input/output interface (I/F) 46E, which are interconnected via bus 46F.

The image memory 44 is connected to the input/output I/F 46E of the arithmetic and control unit 46, and image color signals $R_0$, $G_0$, and $B_0$ of RGB outputted from the solid-state imaging device 38 are fetched by the arithmetic and control unit 46 through the image memory 44. The arithmetic and control unit 46 corrects the fetched image color signals $R_0$, $G_0$, and $B_0$ on the basis of the LATD information r, g, and b from the LATD sensor 34, and effects exposure control at the time of printing by using corrected image color signals $R_1$, $G_1$, and $B_1$. In addition, the arithmetic and control unit 46 stores the corrected image color signals $R_1$, $G_1$, and $B_1$ in an external storage device 52.

The solid-state imaging device 38 is also connected to the input/output I/F 46E of the arithmetic and control unit 46 via a solid-state imaging device controlling unit 50. On the basis of the LATD information r, g, and b fetched from the LATD sensor 34, the arithmetic and control unit 46 determines an electronic shutter time (signal storage time) T of the solid-state imaging device 38, and instructs the same to the solid-state imaging device controlling unit 50. By controlling the electronic shutter portion (not shown) of the solid-state imaging device 38 in the time T instructed by the arithmetic and control unit 46, the solid-state imaging device controlling unit 50 changes the signal storage time of the solid-state imaging device 38 in correspondence with the LATD, and adjusts the levels of the image color signals outputted from the solid-state imaging device 38.

In addition, also connected to the input/output I/F 46E of the arithmetic and control unit 46 are a keyboard 54 for allowing an operator to enter various data, commands, and the like, a CRT 56 serving as an image display unit, and a digital printing unit 58 for effecting printing on the basis of the image color signals stored in the external storage device 52.

Next, a description will be given of this first embodiment.

In a case where images recorded on the negative film 12 are printed onto the printing paper 28 in units of frames, the operator first sets the developed negative film 12 in the negative carrier 14, and then performs predetermined keying operations on the keyboard 54. When predetermined keys of the keyboard 54 are operated, the imaging processing routine shown in FIG. 2 is executed.

Figure 2:
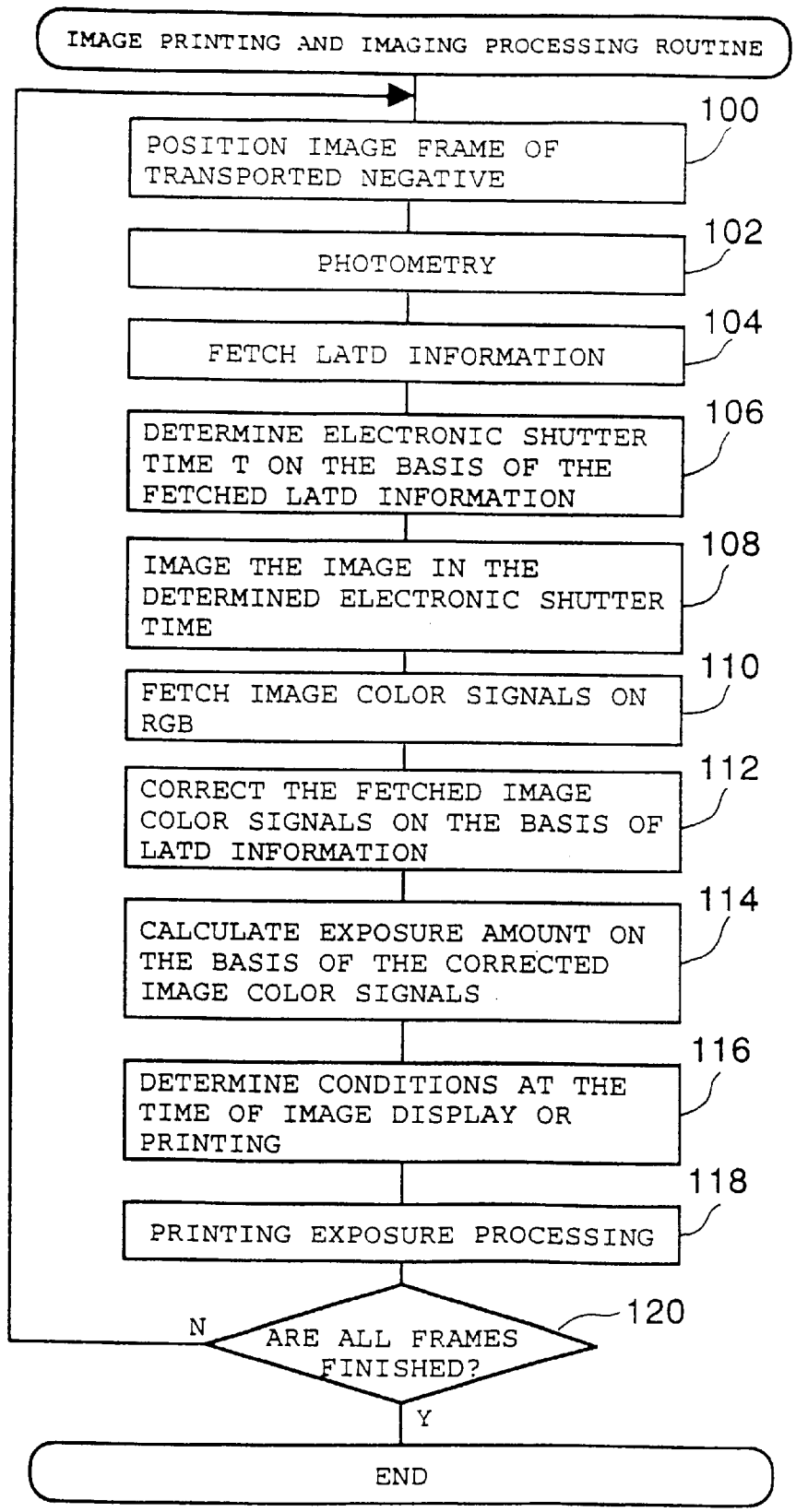
FIG. 2 is a flowchart illustrating an image printing and imaging processing routine.

In the routine shown in FIG. 2, in Step 100, the negative film 12 is transported, and an image frame at a leading end of the negative film 12 is positioned at the printing position. In an ensuing Step 102, the image positioned at the printing position is photometrically measured. That is, the white light source 16 is lighted up to illuminate the positioned image, and the light transmitted through the image is received by the LATD sensor 34 through the first light-branching member 22, the lens 30, and the second light-branching member 32. At this time, the black shutter 26 is closed, so that the image is not printed onto the printing paper 28. In addition, the electronic shutter portion of the solid-state imaging device 38 is not controlled, and neither is the image imaged by the solid-state imaging device 38.

In an ensuing Step 104, the LATD information r, g, and b on the respective colors R, G, and B of the image is fetched from the LATD sensor 34, and is stored in the memory such as the RAM 46C. In Step 106, the electronic shutter time T of the image-forming lens system 38 is determined on the basis of the fetched LATD information. That is, since the sensitivity of the solid-state imaging device 38 does not possess a sufficient dynamic range, there is a possibility of each pixel of the solid-state imaging device 38 from becoming saturated depending on the density of the image recorded on the negative film 12. For this reason, in Step 106, the electronic shutter time T is determined so as to obtain a solid-state device sensitivity corresponding to the density (LATD) of the image. In Step 108, the image is imaged by using the determined electronic shutter time T. Namely, as the electronic shutter time T is instructed to the solid-state imaging device controlling unit 50, the solid-state imaging device controlling unit 50 controls the opening and closing of the electronic shutter portion of the solid-state imaging device 38 by using the instructed electronic shutter time T. As a result, the signals are stored in the solid-state imaging device 38 in the signal storage time T, and the stored signals are outputted from the output terminal as the image color signals.

The image color signals $R_0$, $G_0$, and $B_0$ of RGB outputted from the solid-state imaging device 38 are stored in the image memory 44 via the amplifier 40 and the A/D converter 42. At this time, since the electronic shutter time T of the solid-state imaging device 38 is set in advance in correspondence with the density (LATD) of the image to be printed, the image color signals $R_0$, $G_0$, and $B_0$ outputted from the solid-state imaging device 38 are substantially at predetermined levels.

In Step 110, the image color signals $R_0$, $G_0$, and $B_0$ are fetched from the image memory 44. In an ensuing Step 112, the ratio of the fetched image color signals $R_0$, $G_0$, and $B_0$ is corrected in such a manner as to become equal to the RGB output ratio (the ratio of the LATD information r, g, and b) of the LATD sensor 34. Namely, in Step 112, the type of the negative film 12 is first determined, a table stored in the ROM 46B is then searched by using the determined type of the negative film 12 as a reference for selection, and a matrix coefficient (correction coefficient) A corresponding to the type of the negative film 12 is thereby fetched from the table. Next, the fetched matrix coefficient A is substituted into a determinant in the following Formula (1) to obtain the image color signals $R_1$, $G_1$, and $B_1$.

$$\begin{pmatrix} R_1 \\ G_1 \\ B_1 \end{pmatrix} = \begin{pmatrix} A_{11} & A_{12} & A_{13} \\ A_{21} & A_{22} & A_{23} \\ A_{31} & A_{32} & A_{33} \end{pmatrix} \cdot \begin{pmatrix} R_0 \\ G_0 \\ B_0 \end{pmatrix} \quad (1)$$

The aforementioned matrix coefficient A is set such that the ratio of average values of the corrected image color signals $R_1$, $G_1$, and $B_1$ becomes equal to the ratio of the outputs r, g, and b from the LATD sensor 34 as closely as possible. For this reason, the image color signals after being corrected by the matrix coefficient A assume a color balance which conforms to the color of the actual image measured by the LATD sensor 34, irrespective of the spectral sensitivity characteristics of the solid-state imaging device 38, thereby making it possible to optimize the color information of the image color signals. Incidentally, although the quantities of light of the respective colors of R, G, and B transmitted through the negative film 12, i.e., the transmission spectral characteristic of the negative film 12, varies substantially depending on the type of negative film, if different matrix coefficients A are prepared in advance for the respective types of the negative film as described above, and the matrix coefficient A is selected according to the type of the negative film 12, the color information of the image color signals is optimized irrespective of the type of the negative film 12.

Although, in the above, different matrix coefficients A are stored for the respective types of the negative film 12, different matrix coefficients may also be stored for respective densities of images. If the matrix coefficients are thus prepared for different types of negatives and densities, the image color signals can be corrected with higher accuracy.

In addition, as with the method of determining the type of the negative film 12, it is sufficient to employ the method in which the type of the negative film 12 is entered by the operator through the keyboard 54, or the method in which information representing the type of the negative film 12 is optically or magnetically recorded in advance on the negative film 12 and is read by a read head.

In an ensuing Step 114, an exposure amount Ei at the time of the printing of the image is calculated for each of a corrected R, G, and B. That is, correction values of color failures or the like are calculated by using the corrected image color signals, and the exposure amount Ei is calculated on the basis of the calculated result. Incidentally, if the calculation of the exposure amount Ei is performed after reducing the apparent number of pixels (the number of pieces of data) by subjecting the corrected image color signals to local smoothing processing, the aforementioned calculation can be effected speedily.

In Step 116, the conditions at the time of display of the image and digital printing are determined by using the correction values of the color failures or the like calculated in the calculation of the exposure amount Ei. At this time, the image is displayed on the CRT 56, and may be corrected by the operator, if necessary.

In an ensuing Step 118, printing exposure processing is effected. In this printing exposure processing, after the position of the light-adjusting filter 18 is controlled on the basis of the calculated exposure amount Ei, the black shutter 26 is opened. Consequently, the light emitted from the white light source 16 is applied to the printing paper 28 after consecutively passing through the light-adjusting filter 18, the diffusion box 20, the negative film 12, the first light-branching member 22, the image-forming lens system 24, and the black shutter 28, and an image (one frame) positioned at the printing position is printed onto the printing paper 28.

In Step 120, a determination is made as to whether or not the above-described processing has been completed with respect to all the image frames recorded on one negative film 12. If NO is the answer in the determination in Step 120, the printing paper 28 is fed, and the operation returns to Step 100 to repeat the above-described operation. As a result, the plurality of images recorded on the negative film 12 are consecutively printed onto the printing paper 28, and are also consecutively read by the solid-state imaging device 38.

As for the image color signals R, G, and B obtained by the solid-state imaging device 38, after color information is appropriately corrected, as required, the corrected image color signals $R_1$, $G_1$, and $B_1$ are stored in the external storage device 52. If all of the above-described processing is completed with respect to the plurality of images recorded on the negative film 12, YES is given as the answer in the determination in Step 120, and the routine ends.

It should be noted that the image color signals stored in the external storage device 52 are transmitted to the CRT 56, as required, to display an image on the CRT 56 so as to allow the operator to effect inspection, or the stored image color signals are transmitted to the digital printing unit 58 so as to be utilized in the preparation of photographic prints.

As described above, in this embodiment, since the image color signals for R, G, and B outputted from the solid-state imaging device 38 are corrected in such a manner as to approximate the RGB output ratio of the LATD sensor 34, i.e., the color balance of the image measured by using the LATD sensor 34, even in a case where the spectral sensitivity characteristics of the solid-state imaging device 38 do not conform to the transmission spectral characteristics of the negative film 12, the color balance (color information) of the image color signals for R, G, and B can be made to match the color of the actual image. For this reason, correct color can be reproduced when an image is displayed on the CRT 56 by using the image color signals or the so-called index printing is effected by the digital printing unit 58.

In addition, in this embodiment, since the exposure amount at the time of the printing of an image is determined on the basis of the corrected image color signals, and printing processing is effected by the determined exposure amount, it is unnecessary to use the MOS sensor in the conventional manner, thereby making it possible to reduce the cost of the apparatus. Namely, since it is possible to determine an appropriate exposure amount by correcting the image color signals from the solid-state imaging device 38 and by calculating color failure correction values or the like by the use of the corrected image color signals, it becomes unnecessary to obtain image information using the MOS sensor or the like in the conventional manner, and it suffices to obtain only the color information on the image. For this reason, an inexpensive LATD sensor 34 such as photodiodes or the like can be used instead of the expensive MOS sensor or the like.

In addition, in this embodiment, since the signal storage time (sensitivity) of the solid-state imaging device 38 is altered on the basis of the output of the LATD sensor 34, image color signals of optimal levels can always be outputted from the solid-state imaging device 38 with respect to all the negatives ranging from high-density negatives to low-density negatives. Moreover, since the sensitivity of the solid-state imaging device 38 is altered on the basis of the output of the LATD sensor 34, photometry can be effected more speedily by quickly changing the sensitivity of the solid-state imaging device, than in a case where the sensitivity of the solid-state imaging device is adjusted in stages.

Figure 4:
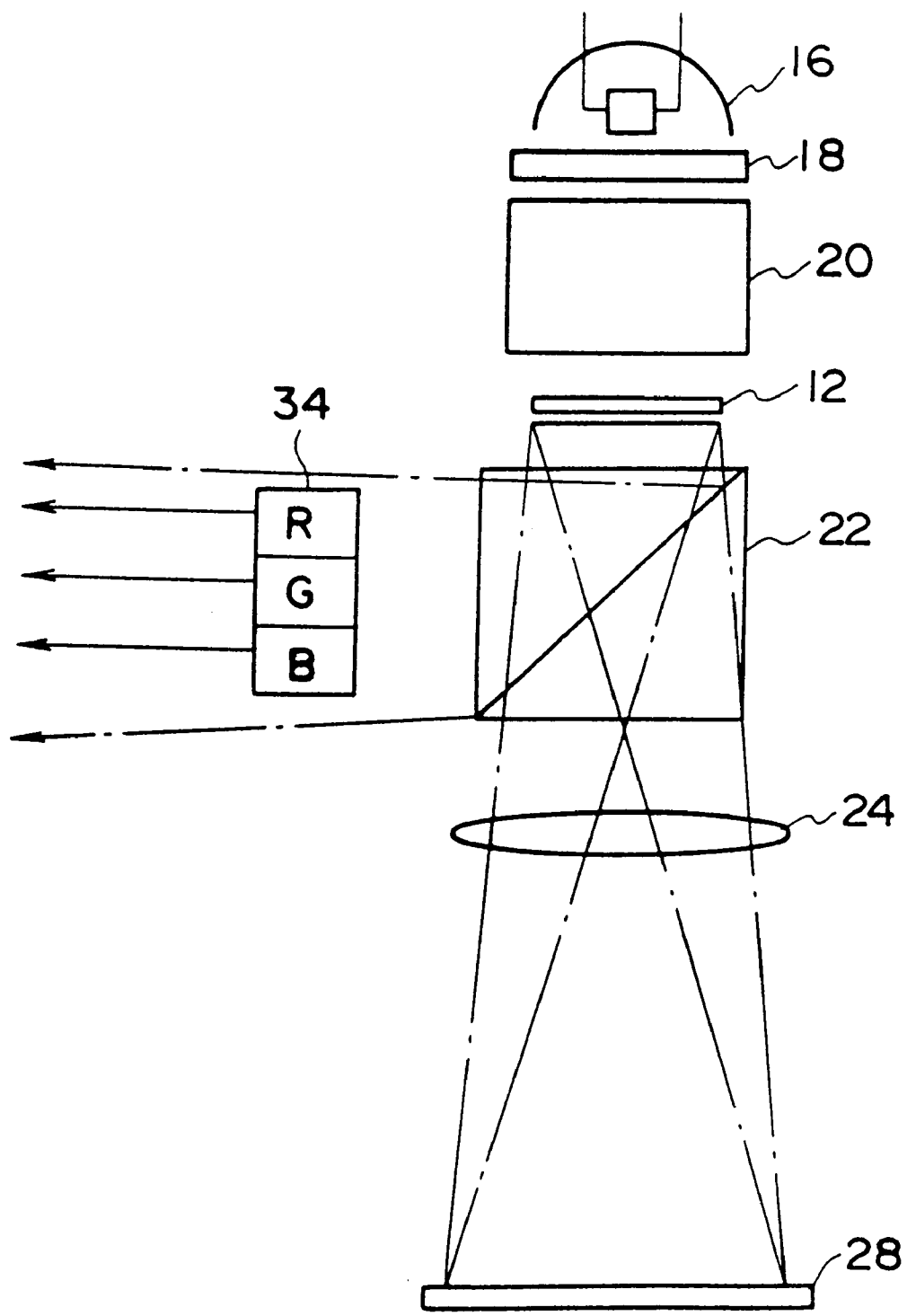
FIG. 4 is a diagram explaining the position where an LATD sensor is disposed in a case where the light transmitted through a photographic film is branched off from a printing optical path and is received.
Figure 5:
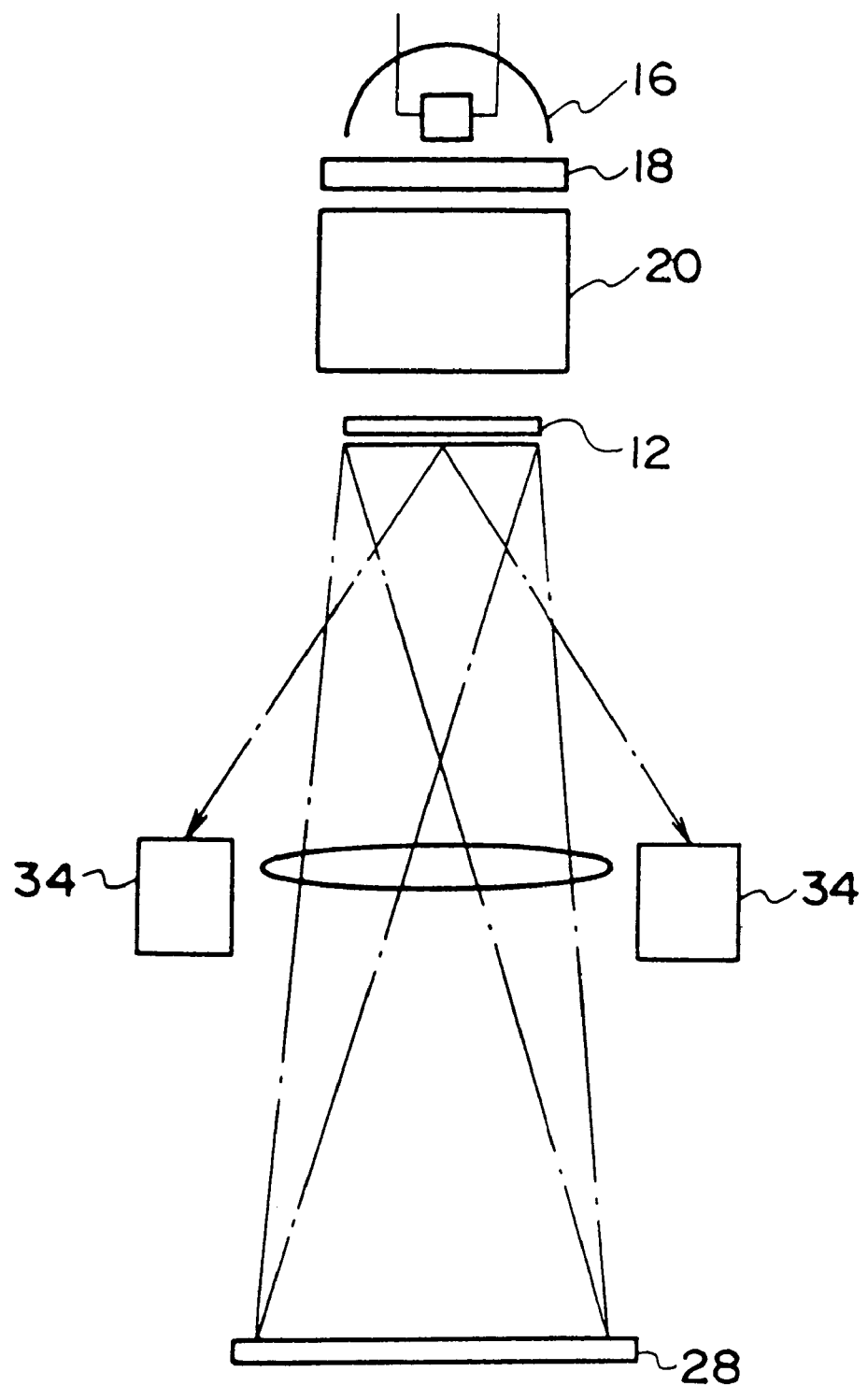
FIG. 5 is a diagram explaining the position where the LATD sensor is disposed in a case where the light diffused from the photographic film is received.

In addition, in this embodiment, since part of the light transmitted through the negative film 12 is branched off from the printing optical path Y by the first light-branching member 22, and the branched light is received by the LATD sensor 34, as schematically shown in FIG. 4, the LATD of the negative image can be measured accurately and the correction of the image color signals can be effected accurately as compared with a case where the light diffused from the negative film 12 is received, as shown in FIG. 5.

Moreover, since the LATD of the entire region of the image can be measured uniformly by the single LATD sensor 34, the number of parts required does not increase.

Figure 3:
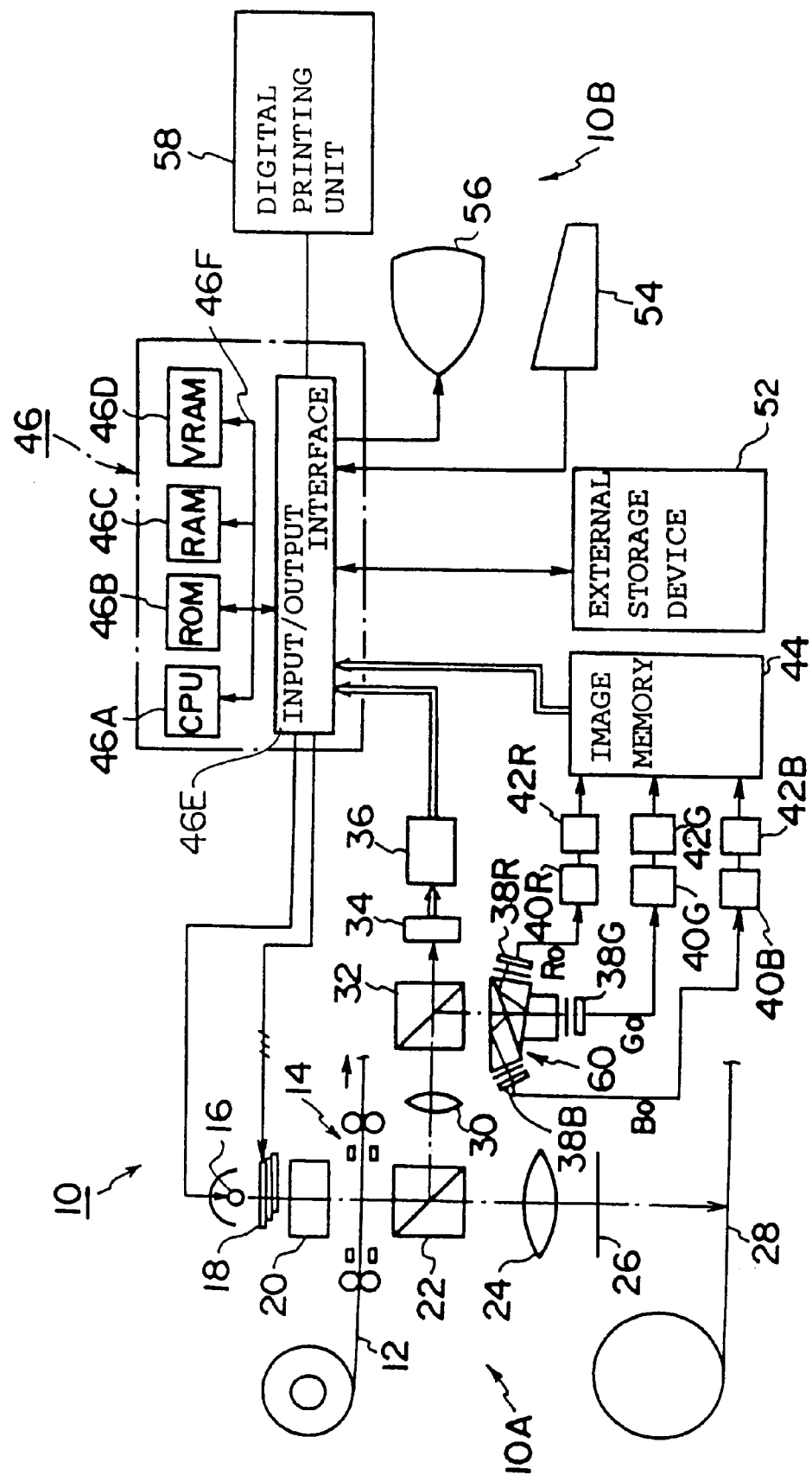
FIG. 3 is a schematic diagram illustrating another example of the photographic printer.

It should be noted that although, in the above-described embodiment, the image color signals for R, G, and B outputted from the single solid-state imaging device 38 are corrected on the basis of the RGB output ratio of the LATD sensor 34, an arrangement may be provided such that, as shown in FIG. 3, the light transmitted through the negative film 12 and branched off by the first and second light-branching members 22 and 23 is separated into the three colors of R, G, and B by a color separation prism 60, and the separated light of the respective colors of R, G, and B is read by solid-state imaging devices 38R, 38G, and 38B. In this case, if the solid-state imaging devices 38R, 38G, and 38B are connected to the arithmetic and control unit 46 via an unillustrated solid-state imaging device controlling unit, and electronic shutter times (signal storage times) $T_R$, $T_G$, and $T_B$ of the solid-state imaging devices 38R to 38B are respectively controlled independently by the arithmetic and control unit 46 in correspondence with the ratio of RGB outputs from the LATD sensor 34, it is possible to obtain image color signals $R_0$, $G_0$, and $B_0$ of RGB having accurate color information. Further, since the light transmitted through the negative film 12 is separated into the three colors of R, G, and B, and is imaged onto the solid-state imaging devices 38R to 38B, respectively, it is possible to obtain image color signals having a higher spatial resolution.

In addition, in the above-described embodiment, although the half prism is used as the light-branching member 22, it is possible to use a reflecting mirror of a movable type which is capable of being changed over between a state in which it is disposed in the printing optical path Y and a state in which it is retreated from the printing optical path Y. In this arrangement, the light transmitted through the negative film 12 can be received with a large quantity of light by the LATD sensor 34, so that the LATD of the image can be detected accurately. In addition, the position where the LATD sensor 34 is disposed is not limited to the above-described position, and the LATD sensor 34 may be attached to the black shutter 26, for example.

In addition, in the above-described embodiment, although three photodiodes are provided as the LATD sensor 34 in correspondence with the three colors of R, G, and B, the present invention is not limited to the same, and it is possible to use phototransistors, photomultiplier tubes, or the like.

As described above, in accordance with the present invention, an outstanding advantage is obtained in that it is possible to obtain image color signals with accurate color information and a high spatial resolution without using an expensive MOS sensor.

What is claimed is:

1. An imaging apparatus for reading an image recorded on a photographic film, comprising:
    a solid-state imaging device on which an image derived from light transmitted through the photographic film is formed;
    a density-measuring device for receiving the light transmitted through the photographic film and for measuring a large area transmittance density of the image for each color of R, G, and B; and
    correcting means for correcting image color signals of the respective colors of R, G, and B outputted from said solid-state imaging device, on the basis of a ratio of large area transmittance densities of the image for the respective colors of R, G, and B determined from an RGB output of said density-measuring device.

2. An imaging apparatus according to claim 1, further comprising:
    dynamic-range changing means for changing a dynamic range when the image is imaged by said solid-state imaging device on the basis of the output of said density-measuring device.

3. An imaging apparatus according to claim 1, wherein a spectral sensitivity of said density-measuring device is made to conform to a spectral sensitivity of a recording material for printing.

4. An imaging apparatus according to claim 2, wherein a spectral sensitivity of said density-measuring device is made to conform to a spectral sensitivity of a recording material for printing.

5. An imaging apparatus according to claim 1, wherein said density-measuring device is disposed in a direction of light branching by light branching means which is disposed on an optical path of the transmitted light and is adapted to branch off part of the light leading to said solid-state imaging device.

6. An imaging apparatus according to claim 2, wherein said density-measuring device is disposed in a direction of light branching by light branching means which is disposed on an optical path of the transmitted light and is adapted to branch off part of the light leading to said solid-state imaging device.

7. An imaging apparatus according to claim 3, wherein said density-measuring device is disposed in a direction of light branching by light branching means which is disposed on an optical path of the transmitted light and is adapted to branch off part of the light leading to said solid-state imaging device.

8. An imaging apparatus according to claim 1, wherein correction values of color failure are calculated on the basis of the image color signals corrected by said correcting means, and wherein exposure data is calculated on the basis of the correction values.

9. An imaging apparatus according to claim 2, wherein correction values of color failure are calculated on the basis of the image color signals corrected by said correcting means, and wherein exposure data is calculated on the basis of the correction values.

10. An imaging apparatus according to claim 3, wherein correction values of color failure are calculated on the basis of the image color signals corrected by said correcting means, and wherein exposure data is calculated on the basis of the correction values.

11. An imaging apparatus according to claim 4, wherein correction values of color failure are calculated on the basis of the image color signals corrected by said correcting means, and wherein exposure data is calculated on the basis of the correction values.

12. An imaging apparatus according to claim 5, wherein correction values of color failure are calculated on the basis of the image color signals corrected by said correcting means, and wherein exposure data is calculated on the basis of the correction values.

13. An imaging apparatus according to claim 6, wherein correction values of color failure are calculated on the basis of the image color signals corrected by said correcting means, and wherein exposure data is calculated on the basis of the correction values.

14. An imaging apparatus according to claim 7, wherein correction values of color failure are calculated on the basis of the image color signals corrected by said correcting means, and wherein exposure data is calculated on the basis of the correction values.

15. An imaging apparatus according to claim 1, wherein said density-measuring device includes a density-measuring sensor, and wherein said density-measuring sensor is one of a photodiode, a phototransistor, and a photomultiplier tube.

16. An imaging apparatus for reading an image recorded on a photographic film, comprising:

a solid-state imaging device on which a first image derived from light transmitted through the photographic film is formed;

a density-measuring device for receiving the light transmitted through the photographic film and for measuring a large area transmittance density of a second image, for each color of R, G, and B; and correcting means for correcting image color signals of the respective colors of R, G, and B outputted from said solid-state imaging device, on the basis of a ratio of large area transmittance densities of the image for the respective colors of R, G, and B determined from an RGB output of said density-measuring device.

17. An imaging apparatus for reading an image recorded on a photographic film, comprising:

a solid-state imaging device on which an image derived from light transmitted through the photographic film is formed, said imaging device disposed on a first light path;

a density-measuring device for receiving the light transmitted through the photographic film and for measuring a large area transmittance density of the image for each color of R, G, and B, said density-measuring device disposed on a second light path; and a correction device that corrects image color signals of the respective colors of R, G, and B outputted from said solid-state imaging device, on the basis of a ratio of large area transmittance densities of the image for the respective colors of R, G, and B determined from an RGB output of said density-measuring device, said correction device having a central processing unit.

18. An imaging apparatus according to claim 16, further comprising:

dynamic-range changing means for changing a dynamic range when the image is imaged by said solid-state imaging device on the basis of the output of said density-measuring device.

19. An imaging apparatus according to claim 16, wherein a spectral sensitivity of said density-measuring device is made to conform to a spectral sensitivity of a recording material for printing.

20. An imaging apparatus according to claim 17, wherein a spectral sensitivity of said density-measuring device is made to conform to a spectral sensitivity of a recording material for printing.

21. An imaging apparatus according to claim 16, wherein correction values of color failure are calculated on the basis of the image color signals corrected by said correcting means, and wherein exposure data is calculated on the basis of the correction values.

22. An imaging apparatus according to claim 17, wherein correction values of color failure are calculated on the basis of the image color signals corrected by said correction device, and wherein exposure data is calculated on the basis of the correction values.

23. An imaging apparatus according to claim 18, wherein correction values of color failure are calculated on the basis of the image color signals corrected by said correcting means, and wherein exposure data is calculated on the basis of the correction values.

24. An imaging apparatus according to claim 19, wherein correction values of color failure are calculated on the basis of the image color signals corrected by said correcting means, and wherein exposure data is calculated on the basis of the correction values.

25. An imaging apparatus according to claim 16, wherein said density-measuring device includes a density-measuring sensor, and wherein said density-measuring sensor is one of a photodiode, a phototransistor, and a photomultiplier tube.

26. An imaging apparatus for reading an image recorded on a photographic film, comprising:

a solid-state imaging device on which a first image derived from light transmitted through the photographic film is formed;

a density-measuring device for receiving the light transmitted through the photographic film and for measuring a large area transmittance density of a second image, for each color of R, G, and B; and a correction device that corrects image color signals of the respective colors of R, G, and B outputted from said solid-state imaging device, on the basis of a ratio of large area transmittance densities of the image for the respective colors of R, G, and B determined from an RGB output of said density-measuring device, said correction device having a central processing unit.

\* \* \* \* \*